United States Patent Office 3,310,410
Patented Mar. 21, 1967

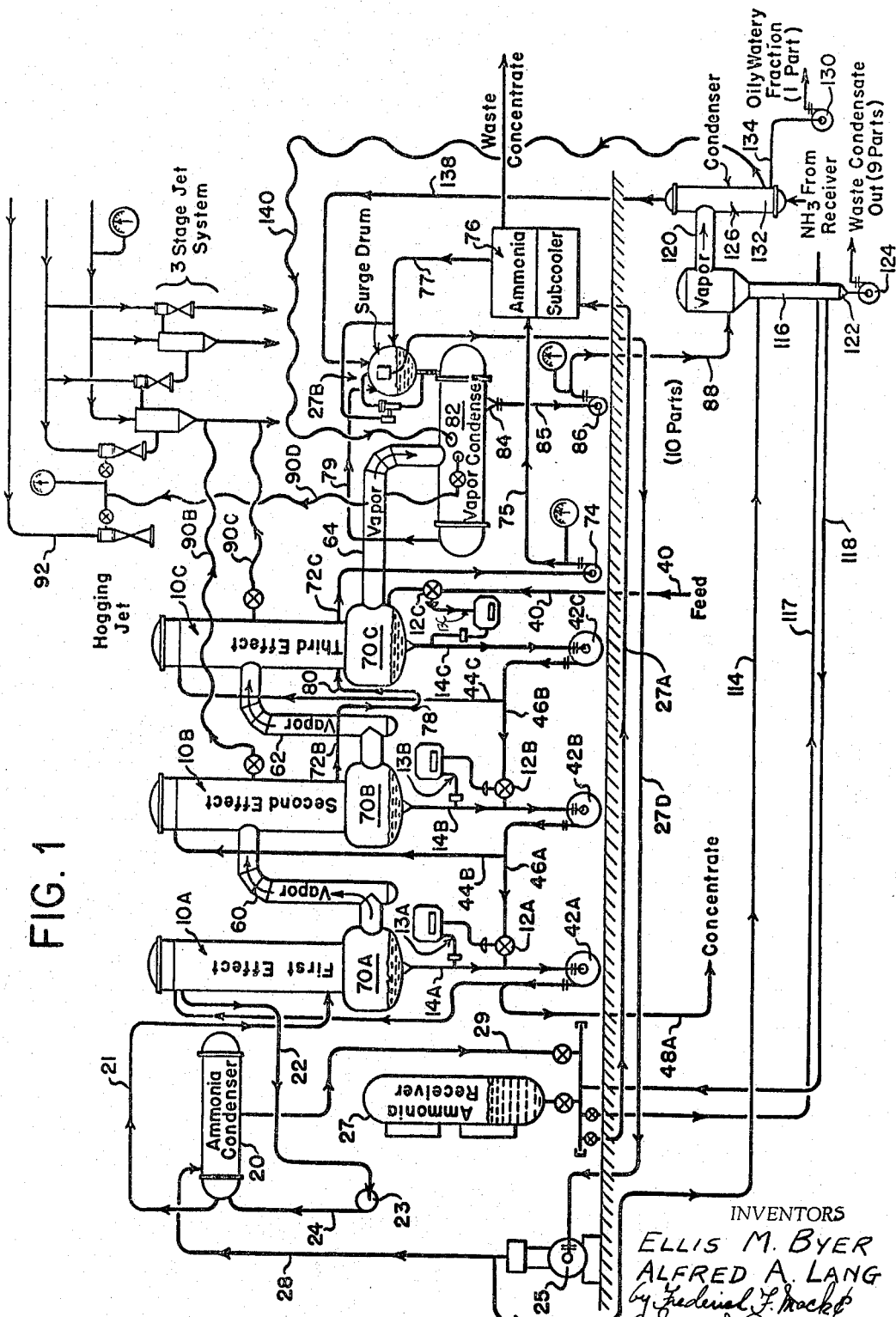

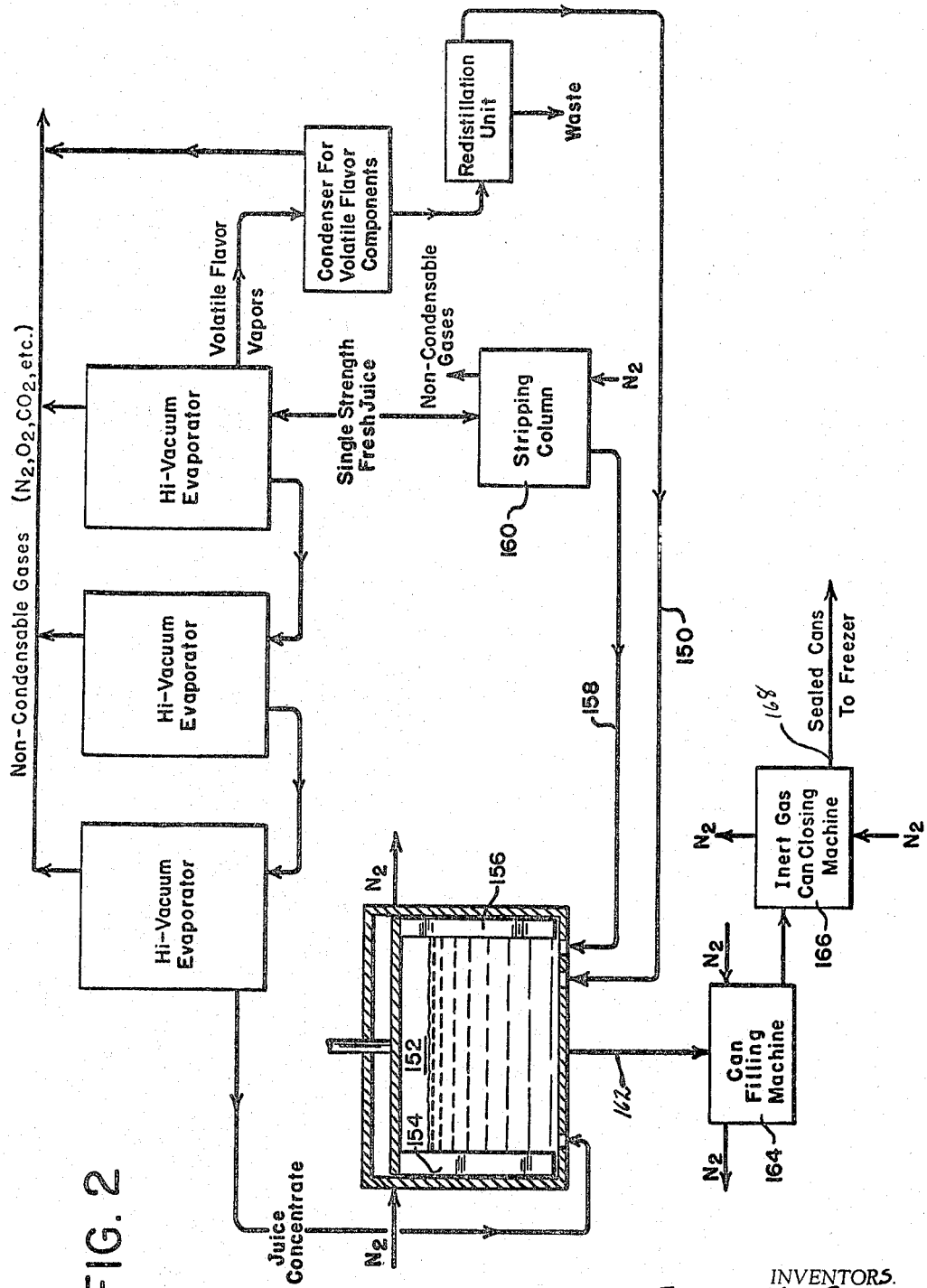

3,310,410
PROCESS FOR FORTIFYING FRUIT JUICE
Alfred A. Lang, Winter Haven, Fla., and Ellis M. Byer, Albany, Oreg., assignors to General Foods Corporation, White Plains, N.Y., a corporation of Delaware
Filed Jan. 13, 1964, Ser. No. 342,844
The portion of the term of the patent subsequent to Jan. 21, 1981, has been disclaimed
8 Claims. (Cl. 99—205)

This application is a continuation-in-part of our co-pending application Ser. No. 82,824, filed Jan. 16, 1961, now U.S. Patent No. 3,117,877.

The present invention relates to improvements in the stabilization of flavor-enhanced vegetable concentrates and, more particularly, to a process for the recovery from fruit juices of volatile constituents and the incorporation thereof into concentrates characterized by their stability and acceptability throughout the period of storage.

It is an object of the present invention to provide a process whereby volatile flavor fractions recovered from fruit juices, typically citrus juices, are incorporated into a juice concentrate in a condition whereby a fresh fruit-like flavor is provided for an unusual storage period.

A specific object of the invention is to provide means whereby a high yield of a desired fresh fruit flavor fraction can be employed in a juice concentrate without employing complicated plant equipment.

Heretofore, it has been proposed to flavor-enhance juice concentrates by recovering most of the volatile flavor-producing constituents evaporated in the course of concentrating fruit juices. These constituents have various high and low boiling points. Thus, the art has been concerned in the past with the problems encountered in the collection of all or most of these constituents. Suggested procedures have called for condensation, absorption, or other means for separation and collection of volatile essences, including esters, alcohols, aldehydes and other organic constituents, by the employment of a wide range of temperatures and pressures. Such collection techniques may be wasteful of expensive refrigerants such as liquid nitrogen, liquid air and the like, and call for complex condensate handling means which limit the applicability of such procedures on a wide scale in the juice concentrate art. Then too, such collection techniques involve the recovery of a large quantity of low molecular weight gases such as nitrogen, carbon dioxide, oxygen and other non-condensables which have a high diffusivity creating high vapor velocities and hindering the ability to condense the desired volatile essences on a practical scale.

Others in the art have suggested procedures whereby flavor values produced in the course of a partial evaporation of a juice are condensed at less reduced temperatures; here also, however, the prior art workers have mainly been concerned with the collection of as much as possible of these volatile constituents, including the more volatile materials and, as a consequence, have suggested the use of relatively complex packed fractionating columns, singly or in series. Such means generally place a substantial burden upon plant investment and operation and have not been found to produce an adequate yield or quality of flavoring material for use in fortification of concentrates. In the main such techniques have been concerned with the recovery of constituents which boil at temperatures lower than the boiling point of water and discarding some valuable higher boiling flavoring components. Although low boiling constituents offer some fragrance reminiscent of fresh juice, they are recovered at only a relatively minor inconsequential level such that their use in large quantities on a commercial basis is impractical.

It has been discovered that a high yield of useful volatile flavoring constituents can be recovered in a practical concentration for subsequent use in a manner which calls for only moderately reduced working temperatures and, surprisingly, is isolated from volatile fractions heretofore discarded.

The present invention is applicable to a variety of fruit juices which range in their sensitivities to operating temperatures. The term "fruit" as it is employed herein and in the accompanying claims is intended to apply not only to citrus juices such as those from orange, grapefruit, tangerine, and the like, but also to non-citrus fruit juices typified by those from tomato, strawberries, boysenberries, grape, prune, apple, and the like. Indeed, the term "fruit" as it is employed herein and in the accompanying claims is intended to apply to plant juices generally and not be restricted to plant juices commonly classed as fruits, since many of such juices or extracts typified by the water extract of roasted and ground coffee also contain ingredients which provide desired essences, esters, alcohol, adehydes, and other organic constituents more or less recoverable and stabilized by the present invention. The term "juices" is therefore employed to include extracts, nectars, purees and, generally, plant liquids separated from plant tissue by mechanical extraction or by solution and which may contain therein food solids as well as liquids, all of which are desirably concentrated by at least partial evaporation of water therefrom.

The present invention involves the recovery of a specific flavor fraction of use from volatile constituents of fruit juices and the incorporation of this fraction in a concentrated juice portion under conditions wherein the oxygen content of such juices and said flavor fraction is at an extremely low level, typically less than 0.20 ml. oxygen per 100 gms. of juice concentrate containing the flavor fraction. The maximum oxygen level specified herein uses a juice concentrate product having a Brix level of 42° as a reference point. The maximum oxygen level at other Brix levels can be readily determined by adjusting the figures to such reference level of 42° Brix. Thus, the maximum oxygen content as defined in the description and claims of this application is intended to cover the oxygen content at different Brix levels which correspond to 0.20 ml. per 100 gms. of final juice concentrate having a Brix level of 42°. The specific fraction of use is recovered by:

(a) Causing the fruit juice to flow rapidly, preferably in a thin, continuous film, over a heat exchange surface which is under a substantially reduced subatmospheric pressure, typically less than 1½" of mercury, in a closed system to partially concentrate the juice by separating it into a major juice concentrate portion and a minor volatile portion condensed to include flavor-producing volatile constituents boiling at temperatures higher and lower than that of water and to exclude non-condensable gaseous constituents including oxygen. The temperatures employed to effect such separation will be dependent in great measure upon the identity of the juice being processed. In the case of a citrus juice, the juice temperature generally does not exceed 120° F. at any point in its flow over the heat exchange surface and, more ideally, the citrus juice is caused to travel at temperatures above about 40° F. and below about 80° F. However, for other juices typified by tomato, higher temperatures may be employed, say 140° F., where the flavors in the juice concentrate portion as well as desired constituents separated therefrom are not as sensitive to heat;

(b) The aforesaid volatile fraction produced by the first step is thereafter subjected to condensation continuously, at such temperatures that the volatile flavor-producing constituents are collected as a two-phase oily-watery mixture. Advantageously, the temperatures at which this oily-watery mixture may be collected by condensation may be only moderately reduced, typically 30°–70° F. Usually, it is found that the desired condensate collected is in the neighborhood of 5–15% by weight of the juice initially introduced to the evaporator system or third effect vaporization chamber;

(c) The aforesaid two-phase mixture is thereafter separated into a minor subfraction containing desirable high as well as low boiling flavor-producing constituents and a major subfraction containing mainly previously condensed water and an undesirable quantity of oily flavor-producing constituents. It is this minor subfraction which has been found to offer desirable flavor enhancement to the juice concentrate. Such separation can be carried out by azeotropic distillation of the two-phase mixture under absolute pressures of less than 1½″ of mercury at temperature of 50°–100° F. or by any other process yielding substantially the same minor subfraction, as will be described hereinafter. Preferably the minor subfraction is further subdivided by allowing the watery and oily phases to separate one from another upon standing, the watery phase being continuously removed from the bottom of this separation while accumulating an oil level on the surface; upon sufficient oil accumulation, this oil is drained off separately and subsequently mixed with a quantity of suitable high boiling organic material, typically cold pressed citrus oil in the case of citrus juices, e.g., cold pressed orange oil. For the purposes of the present invention it is preferred that this minor subfraction be collected by condensation in a closed system, that is one where no external vapors are introduced to the minor subfraction.

The minor subfraction of use generally represents about 0.5–1.5% by weight of the whole juice. The specific subfraction of citrus juices like orange and grapefruit is relatively colorless and has a light, cloudy appearance stemming from the emulsification therein of the minute quantity of oily material associated therewith, which minute quantity makes a desirable flavor contribution. The specific subfraction of use is ideally recoverable by evaporation at only moderately elevated temperatures and by condensation at temperatures ranging above 30° F. and upwardly to 70° F. when employing absolute pressures in the neighborhood of less than 1½ In. of Hg; however, this fraction may also be condensed at temperatures below 30° F. by means of a brine solution or other refrigerating means which, depending on the temperature of condensation, may cause icing in the collection vessel and which permit recovery of the fraction as a snow rather than liquid.

It is a feature of the present invention that the foregoing minor subfraction of use is added to a juice concentrate under such conditions that the residual oxygen level in the packaged concentrate is less than 0.20 ml. oxygen per 100 gms. of juice concentrate at 42° Brix. It has been discovered that at such drastically reduced oxygen levels the stability of the flavor fraction of use in storage is prolonged for an unusual period of time. One embodiment of the present invention involves the incorporation of this volatile fruit flavor fraction into concentrate to which raw or dilute juice commonly referred to in the citrus industry as "cut-back" juice has not been added; to this practice the oxygen level in a final juice concentrate having a Brix level of 42° can be reduced as low as 0.02 ml. per 100 gms. of concentrate. The total gas level in such a concentrate can be reduced to 0.10 ml. per 100 gms. of concentrate. However, it is also within the spirit of this invention, and it is a preferred embodiment that single strength fresh juice (cut-back) may be combined with the concentrate to which the fruit flavor fraction has been added; in this practice oxygen levels of 0.17 ml. and less have been observed in the packaged product. The level can be materially reduced in cases where the citrus juice or other fruit juice concentrate has cut-back juice added to it, by subjecting the cut-back juice to an oxygen-stripping operation employing an inert gas such as nitrogen to remove oxygen from the cut-back juice prior to its being blended with the concentrate. In cases where the cut-back juice is not employed the juice concentrate is nevertheless protected from pick-up of oxygen in subsequent operations by carrying out the concentration in multi-effect evaporators which are substantially air tight, it having been found that the conventional pumps, valves and lines to the various high vacuum evaporators may serve (unless properly sealed) to aerate concentrate with sufficient oxygen to impair the storageability of a juice concentrate containing the specific flavor fraction of use. The presence of even a trace quantity of oxygen, say above the level of less than 0.20 ml. oxygen per 100 gms. of juice concentrate at the reference Brix level of 42° will result in a noticeable deterioration of the flavor values stemming from the use of the specific flavor fraction of use. Accordingly, the various stages of the customary juice concentration operation, viz., the high vacuum evaporators, the mixing and storage tanks, and the can filling machines as well as the lines interconnecting these stations should be designed to preclude the ingress of oxygen into the juice.

In the course of packaging juice concentrate with the specific flavor fraction of use it may also be found to be desirable to take precautions that a low oxygen containing atmosphere is present in the headspace of the can prior to sealing; such a condition can be created by the forming of a vacuum in the headspace, or by sweeping the headspace with an atmosphere of nitrogen or some other inert gas.

It will be recalled that the foregoing process for recovering the volatile fruit flavor fraction desired may be carried out under subatmospheric pressures at only moderately elevated temperatures in the initial whole juice concentration step; the juice concentrate portion may be subsequently introduced on either a continuous or batch basis to further heat exchange equipment wherein it may be caused to again travel in the form of a thin film over one or more heat exchange surfaces also maintained under subatmospheric pressures but at higher temperatures whereby the more concentrated juices will be reduced in viscosity and thereby more effectively concentrated; in accordance with the present invention this heat exchange equipment is sealed against the possibility of ingress of atmosphere oxygen in order that a substantially oxygen-free atmosphere may be preserved; also, it should be noted that in the course of the various concentration steps the volatiles (mainly water) removed and discarded subsequent to the initial whole juice concentration operation will serve to remove any entrained oxygen or carbon dioxide, the presence of which would be detrimental to flavor stability. Although evaporation temperatures above 100° F. may be practiced in the case of some fruit juices like grape or tomato, most citrus juices call for moderate evaporating temperatures at least in the initial stages of concentration and, hence, it has been found useful in the present process to employ highly volatile so-called refrigerant gases, typically ammonia, which when compressed contain sufficient latent as well as sensible heat to boil the desired volatile constituents as well as entrained oxygen. Since the desired flavor fraction is collectable by condensation at temperatures above 30° F., a continuous heat exchange cycle employing such refrigerant gases is ideally suited to the present process; thus, after the compressed refrigerant gas has surrendered its heat to the juice or juice concentrate, it can be employed in its liquid state to remove sensible heat as well as the heat of condensation from the distilled fraction, the heat of which can be reused to heat the liquid refrigerant for subsequent cycles. The heat of a compressed refrigerant gas may be utilized directly to boil further quantities of juice or it may be employed indirectly through transfer to another medium such as water which could serve in boiling the juice or the concentrate. However, it is not intended that the present process be restricted to the use of such refrigerant gases since steam may be introduced to the heat exchange surface to effect juice concentration as well as redistillation of the two-phase oily-watery mixture and since cold water can be employed to condense the minor volatile portion separated from the initial concentration step as well as the redistilled volatile fraction.

For citrus juice concentration it is preferred that the non-condensables not be collected so that the redistilled condensate employed for flavor enhancement is relatively free of those materials like carbon dioxide and oxygen which impair the flavor values of the concentrate even at temperatures below 0° C. Thus, in the case of orange and grapefruit juice it is preferred that the non-condensables and the difficult condensable volatile vapors be evacuated from the initial concentration of the juice in a non-oxidizing atmosphere and discarded, thereby freeing collection of the first two-phase oily-watery mixture from interference from such non-condensables and highly volatile constituents caused by their high gas velocities and resulting in more stable juice concentrates fortified with the specific flavor fraction of the present invention. In this connection it is noteworthy that the citrus juice concentrates fortified with this flavor fraction have been characterized by their improved freedom from oxidative changes and the accompanying ability to avoid use of costly nitrogen packaging. However, where storage life over an extended period is anticipated, it has been found to be critical to stability of the citrus juice concentrate fortified with this flavor fraction that the operation be carried out in a manner which establishes a low-oxygen level in the packaged product, on the order of less than 0.20 ml. oxygen per 100 gms. of juice concentrate having the reference Brix level of 42°.

Ideally, the specific flavor fraction of use may be mixed in liquid form with the juice concentrate thereby offering the advantages of a simple plant recirculation. However, it has been found that a rather prolonged shelf life for flavor-enhanced concentrate is achieved when the specific flavor fraction of use is frozen into individual portions or pieces, typically cubes or discs, which are introduced to the juice concentrate in the can or other package just prior to freezing. It appears that, by maintaining the specific flavor fraction in a frozen condition separate from the frozen concentrate, the flavor values of the product are maintained over an unusually long period of time.

The invention will now be more fully described by reference to the accompanying drawings. FIG. 1 is a schematic view of a typical plant operation for carrying out juice concentration and flavor fraction recovery; FIG. 2 is a schematic view of the system whereby the juice concentrate and flavor fractions are combined in accordance with this invention.

Referring to FIG. 1, the system will be seen to comprise a number of evaporators, a triple effect evaporator being shown for illustration. A compressed refrigerant gas is introduced to the triple effect evaporator to supply heat for boiling orange juice indirectly through recirculated water. The present invention is not to be restricted to the modification of orange juice concentrator to be described herein since apparatus capable of employing a hot compressed refrigerant gas in a direct heat exchange relationship with boiling juices may also be employed, typically the system disclosed in U.S. Patent No. 2,570,210 to Joseph A. Cross issued Oct. 9, 1951.

For the preferred orange juice concentrator of the present invention, a series of connected falling film type evaporator units 10A, 10B and 10C are employed, each unit comprising a vertical tubular evaporator having a shell and a nest of tubes (not shown) which are retained by suitable upper and lower tube sheets (not shown) in the shell. In the first effect evaporator 10A water is recirculated through a hot refrigerant gas condenser 20 of the shell and tube-type where the heat of the hot gas is transferred through the walls of the tubes, water heated thereby being brought into heat exchange relationship with the tubes of evaporator unit 10A by means of hot water line 21. After the water in the first effect evaporator unit 10A has been brought into heat exchange relationship with the tubes therein to elevate the juice temperature and volatilize low and high boiling aromatic constituents therein, the water is withdrawn from the top of the evaporator through pipe 22, water being recirculated to condenser 20 by means of pump 23 and pipe 24. A suitable ammonia compressor 25 communicating with ammonia condenser 20 through ammonia gas line 28 compresses ammonia vapor whereby hot ammonia gas is delivered into heat exchange relation with gas condenser 20, condensed liquid ammonia collected in condenser 20 flowing into ammonia receiver 27 through line 29. Liquid ammonia in receiver 27 is floated on ammonia line 27A to maintain an adequate supply of liquid ammonia for level control means 27B of vapor condenser 82.

Fresh juice is supplied to evaporator unit 10C through a suitable feed pipe 40, which is located to feed fresh juice at a rate sufficient to maintain the level of liquid shown in sump 70C. A flow control valve 12C located in pipe 40 controls the rate at which fresh juice is delivered to sump 70C and operates under the control of pneumatic level control means 13C in communication with tail pipe 14C for sump 70C. Fresh juice flowing to third effect evaporator 10C is delivered by tail pipe 14C to sump 70C above the liquid level therein so as to flash off the vapors which pass to vapor condenser 82. The liquid in sump 70C passes through line 14C to circulator pump 42C which delivers a major portion thereof through pipe 44C to the upper extremity of the third effect concentrator 10C where it flows downwardly within each of the tubes therein (not shown), the juice being distributed in the tubes by means of a header having suitably mounted therein distributor tubes, a distributor tube being mounted at the upper extremity of each heat exchange tube for assuring uniform distribution of the juice in the form of a falling film in positive contact with the inner walls of the tube, all of which is well known to those skilled in the art, e.g., FIG. 4 of the aforesaid Cross patent. The remainder of the liquid moved by pump 42C passes through pipe 46B for evaporation in the second effect evaporator 10B.

In the system diagrammed in FIG. 1, the boiling juice vapors of the first evaporator unit 10A are brought into heat exchange relation through duct 60 with juice being circulated to the nest of heat exchange tubes in second effect evaporator 10B, and the boiling juice vapors in the second effect evaporator are delivered through duct 62 into heat exchange relationship with the nest of tubes for the third effect evaporator 10C. Thus boiling juice vapors introduced to the shell surround the nest of heat exchange tubes therein and transfer their heat of liquefaction to juice traveling downwardly in contact with the inner walls of the heat exchange tubes in unit 10C, the concentrated juice being collected at sump 70C in the lower extremity of evaporator 10C with the vapors introduced to the shell of evaporator unit 10C being condensed therein, collected and removed from the area around the base of the heat exchange tubes through pipe 72C and delivered by vapor condensate pump 74 through line 75 to an ammonia subcooler generally shown at 76. Similarly, concentrated juice from the first effect evaporator 10A is collected in sump 70A. The juice vapors condensed in the second effect evaporator 10B are removed through pipe 72C and delivered through U-shaped vapor condensate trap 78 and pipe 80 communicating with draw-off pipe 72C through the intermediation of the pool for vapor condensate around the lower extremities of the nest of heat exchange tubes in the third effect evaporator.

In operation fresh juice is admitted through control valve 12C in pipe 40 at a rate sufficient to maintain a substantially constant level of juice in sump 70C of the third effect evaporator unit; similarly, valve 12B is adjusted to effect a level of juice in the sump 70B of the second effect evaporator and valve 12A in line 46A maintains a suitable level of juice in sump 70A of the first effect evaporator, pneumatic level control means 13A, B and C, respectively, being employed to control the operation of valve means 12A, B and C, sensing devices for the pneumatic liquid control units being in communication with tail pipes 14A, B and C, respectively, the operation of such means being well known to those skilled in the art. Thus, through the operation of the valve means just described the rate at which fresh dilute juice and portions of concentrated juice are supplied to the individual evaporator units is controlled to provide a substantially uniform level of juice in the respective sumps of the various effects. Level control means 13C preferably feeds the juice to sump 70C above the level of the liquid therein so as to ensure vaporization of the volatile portion of the juice. This is desirable mainly in the third effect evaporator 10C since this is where the vapors which are used to produce the specific flavor fraction of use are taken off. This type of feed can also be used in the first and second effect evaporators 10A and 10B if desired, instead of the connection shown.

A vacuum is drawn through lines 90B, 90C and 90D communicating with evaporator units 10B and 10C and vapor condenser 82, respectively. The suction drawn through lines 90B, C and D is effected by any well known steam ejection system, the design of which is well known to those skilled in the art, a three stage steam ejection system with a hogging jet being generally shown at 92.

In operation fresh dilute juice delivered to the system through pipe 40 will be evaporated and concentrated through the successive stages of evaporator units 10C, 10B and 10A and eventually delivered by circulation pump 42A through product pipe 48A to additional evaporators for further concentration and subsequent combination with other juice constituents for aromatizing the juice, as will be hereinafter described; the boiling juice vapors produced in the third effect evaporator 10C are removed therefrom through vapor duct 64 and delivered to a tube-type vapor condenser 82 in heat exchange relationship with the vapors, cold liquid ammonia circulating through the tubes of the condenser 82 bringing about condensation of the vapors around the tubes in condenser 82, wherefrom the condensed vapors are collected at sump 84, delivered through pipe 85 to pump 86 and pipe 88 which delivers the juice vapor condensate to means for further concentration. The juice vapors condensed in the third effect evaporator 10C are removed through pipe 72C and are circulated by pump 74 through line 75 to an ammonia subcooler generally shown at 76. Liquid ammonia from receiver 27 reaches the subcooler 76 through line 27A, ammonia subcooler 76 serving to further cool liquid ammonia by having the relatively cooler waste condensate in line 75 brought into heat exchange relation with the liquid ammonia. Thus the temperature of ammonia circulated through line 77 and level control means 27B to vapor condenser 82 is lowered and the efficiency of the vapor condenser is increased. Heat from juice vapors in condenser 82 is transferred to the liquid ammonia, the latter being recirculated back to pump 25 as a gas through line 79 and suction line 27D.

The liquid phase recovered by the condenser 82 is essentially the vapor condensate of fresh dilute juice and is substantially free of the difficultly condensable vapors and non-condensable gases such as nitrogen, carbon dioxide and oxygen. This liquid phase is recovered in the course of initial concentration of fresh juice by subjecting the juice to reduced subatmospheric pressures generally less than 1½″ of mercury absolute and ranging typically downward to about ½″ of mercury and below; as indicated previously the vapors of fresh dilute juice are evaporated at temperatures which will not occasion degradation of the various desirable essenses evaporated and generally will be at a temperature above about 70° F. and not exceed about 140° F.; the range of temperature sensitivities varying, of course, for various juices. The liquid phase contains various constituents (predominately water) many of which boil at temperatures higher as well as lower than that of water. In general, this liquid phase will be recovered as a minor proportion by weight of the fresh juice being subjected to evaporation in the third effect evaporator 10C and, typically, in the case of citrus juice, will be in the neighborhood of 5-15% by weight of the fresh dilute juice.

This liquid phase is subjected to a redistillation or rectification to recover a desired oily-watery fraction. Thus, the liquid phase in pipe 88 is introduced to an evaporator unit wherein it is caused to travel in the form of a thin film along a preferably elongated heat exchange surface which is in heat exchange relationship with a hot gas or liquid, typically, hot ammonia gas. One form of evaporator comprises a tube-type evaporator having a plurality of vertically arranged elongated tubes suitably nested at their upper and lower extremities and adapted to receive the liquid phase delivered thereto from pipe 88. Preferably an evaporator of the type shown in the aforesaid Cross patent is employed, a suitable distributor pipe such as that shown in FIG. 4 of Cross being located at the upper mouth of each tube to cause the liquid phase to travel uniformly down along the inside heat exchange surface thereof. Hot ammonia gas from compressor 25 is delivered through inlet pipe 114 communicating with shell 116 surrounding the nest of tubes, hot ammonia gas being thereby placed in heat exchange relation with the liquid films forming within the tubes and thereby bringing about transfer of sensible heat and latent heat of evaporation to the liquid phase; hot ammonia gas condensing around the tubes is contained within and removed from the shell as a liquid through liquid ammonia pipe 118 communicating with ammonia receiver 27. Substantially all of the low boiling constituents (relative to the boiling point of water) together with certain high boiling constituents are volatilized in the tubes and conducted through duct 120 to vapor condenser 126 wherein they are condensed. The balance of the liquid phase in the tubes which has not volatilized contains high boiling constituents which are undesirable and these materials are collected in a suitable sump generally shown as 122 and pumped as at 124 to a suitable waste. Generally the waste from the liquid phase will be a majority by weight of the liquid phase being treated in the evaporator, typically, 85–95 parts by weight of the liquid phase. Condenser 126 is preferably of the tube-type and has the vapors condensed therein by means of liquid ammonia delivered thereto by line 117 from receiver 27, the liquid ammonia being fed at a temperature in the neighborhood of 30° F.; the vapors condensed around the tubes of the condenser 126 are collected as an oily-watery fraction and are removed therefrom by means of pump 130 communicating with condenser shell 132 through pipe 134. An ammonia gas line 138 connects the shell of condenser 126 with the shell of the surge drum of level control means 27B wherefrom gas is recirculated through line 27D to compressor 25. A vacuum line 140 connects the shell of condenser 126 with vapor condenser 82 from which it derives its vacuum, the latter being under negative pressure from the vacuum system generally indicated at 92. The liquid phase entering the redistillation unit within shell 116 is subjected to a reduced absolute pressure generally between 1½ and ½″ of mercury and below. The temperature of the liquid phase entering the redistillation unit will typically be about 60° F. and generally should be at a temperature whereat low and high boiling constituents are maintained in the liquid phase. The temperature of the liquid phase in the redistillation unit should be above that temperature where, at the particular pressure employed, approximately 10% of the liquid phase will be volatilized and recovered as an oily-watery condensate fraction in condenser 126; the yield of oily-watery fraction condensate will be dependent upon a number of variables including the total area of the heat exchange surface to which the liquid phase may be exposed, the temperature on said surface, the absolute pressure existing in the redistillation unit and the duration of exposure of the liquid phase to any particular temperature. Any volatile constituents vaporized in the course of redistillation and not collected by condenser 126 will be circulated through vacuum pipe 140 to vapor condenser 82 whereby such vapors may be condensed and recycled to the redistillation unit.

It is a feature of the invention that the oily-watery fraction of use is combined with juice concentrate and cut-back juice in a manner which does not materially increase the oxygen content of the juice concentrate product. Referring to FIG. 2 the oily-watery fraction pumped from the redistillation unit by pump 130 is delivered through line 150 to a mixing tank 152 wherein the cut-back juice and juice concentrate from pipe 48A are blended. As will be seen from FIG. 2 the blend tank 152 is enclosed and has incorporated therewith suitable agitators 154 and 156 which gently blend the liquids fed thereto so as to eliminate splashing and any accompanying incorporation of air into the surface of the juice which might otherwise occur should the liquids be sprayed into the blend tank as has been customary in the juice concentrate industry. Accordingly, juice concentrate pipe 48A and cut-back juice supply pipe 158 as well as line 150 empty below the surface of liquids in the blend tank, and preferably at the bottom of the blend tank, 152 thereby eliminating splashing and accompanying air incorporation. Though it has not been found necessary to purge the headspace of the blend tank of oxygen it may be desirable to do so in the manner shown by the sweeping of nitrogen gas through the blend tank. Although it is a feature of the oily-watery fraction that it provides most of the balanced flavor requirements for enhancement of a juice concentrate it may be desirable for some applications to employ single strength fresh juice (that is cut-back juice) in combination with the juice concentrate. When cut-back juice is employed, it is preferred that it be treated in the stripping column 160 where nitrogen gas is fed at a sufficient rate to remove oxygen and carbon dioxide from the cut-back juice. The nitrogen stripped cut-back juice is then in a condition for blending with the other juice constituents.

The blended substantially oxygen-free juice in blending tank 152 is conducted by line 162 to a can-filling machine 164 the juice in which may also be protected by nitrogen purging. The cans are thereafter delivered to a can-closing machine 166 and passed to a freezer as at 168. During the can sealing operation nitrogen may be introduced into the headspace in the can in order to assure an inert atmosphere, although the can-sealing operation may be carried out under normal conditions without materially increasing the oxygen content of the final product. Indeed, it is an advantage of the present invention that by reason of the manner in which the various juice concentrate fractions are blended, nitrogen blanketing of the blend tanks, the can-filling machine as well as the can-closing machine can be substantially eliminated; it having been found that the elimination of splashing in the blend tank and the employment of high capacity, low impeller speed pumps avoids the introduction of air into the juice concentrate.

Where employed herein and in the accompanying claims the oxygen level specified may be determined in accordance with the following procedure:

A measured sample of the final juice concentrate or liquid to be tested is introduced into a container, such as the type commonly known as a "desorbing bulb," which is partially filled with mercury to a desired level. The pressure in the container is slightly below atmospheric pressure at the time the sample is introduced. Either a measured amount of liquid is introduced into the container or the amount of liquid in the sample added may be determined by measuring the difference in weight (or volume) of the liquid before and after the sample is taken.

The liquid level in the container is then lowered causing further evacuation of the space above the liquid. The lowered pressure results in the evolution of gases which occupy the evacuated space. The liquid level in the container is repeatedly raised and lowered in order to insure that all of the gas in the sample is removed. After the cessation of gas evolution, the liquid level in the container is raised so as to compress the liberated gases which are transferred to a gas burette. Upon completion of the transferral the pressure in the burette is adjusted to atmospheric conditions and the volume of gas is measured.

A small amount of 50 percent potassium hydroxide solution is added to the burette to absorb the carbon dioxide in the burette. The pressure in the burette is readjusted to atmospheric conditions and the volume of the gas therein is measured. The decrease in volume from the original measurement represents the total amount of carbon dioxide originally dissolved in the sample. Then, a small amount of alkaline pyrogallol solution [two volumes of 33 percent pyrogallol and one volue of 50 percent potassium hydroxide] is added to the burette so as to absorb the oxygen therein. The pressure in the burette is readjusted to atmospheric conditions and the volume of gas is again measured. The decrease in volume from the last measurement represents the total amount of oxygen originally dissolved in the sample.

If necessary, the oxygen volume measurement is converted to standard temperature and pressure (STP) by suitable temperature and barometric corrections, divided by the weight of the sample, and multiplied by 100 to obtain the results as ml. of oxygen per 100 gms. of the juice concentrate tested.

This ratio is for the specific Brix level of the juice concentrate from which the sample was taken. As discussed hereinbefore, the critical oxygen level described herein utilizes a juice concentrate having a Brix level of 42° Brix as a reference point. Should the Brix level of the juice concentrate from which the sample tested was taken be more or less than 42° Brix, suitable adjustments should be made to convert the last-named ratio to an equivalent ratio at a Brix level of 42° and thereby determine whether the oxygen level is at or below the critical level specified herein. It is, of course, understood that the above oxygen level testing procedure is only one of the many testing precedures which can be used to determine the oxygen level in the product.

The discovery that the high as well as low boiling components of this oily-watery fraction are useful in enhancing a juice concentrate with a well rounded and complete flavor and aroma was to some extent unexpected since it has been previously believed that only the low boiling constituents were useful in this capacity and since the higher boiling constituents had been generally classed as a group making no desirable contribution to flavor and aroma and, indeed, detracting from over-all acceptability. One explanation for the acceptability of the oily-watery fraction recovered may be the presence therein among the high boiling constituents of sack oils believed by some early prior art workers to be derived from juice extracts of the citrus fruits. The oily-watery fraction may be added back directly to the concentrate or to so-called cut-back juice, i.e., the fresh dilute juice to which concentrate has heretofore been added, to give the concentrates a natural flavor. However, it is an advantage of the present oily-watery fraction that cut-back juice need not be employed in preparing suitably flavored finished concentrates. Collateral to this advantage, therefore, is the practicality of concentrating the juice to a lower density than that to which juice concentrate is normally reduced, the practice of adding cut-back juice is no longer necessary. Thus, orange juice concentrate produced in accordance with the present invention will have a Brix level of about 45° and will be adjusted to a Brix level of about 42° by addition of the oily-watery fraction, it being preferred that the oily-watery fraction constitute approximately 5% by volume of the juice concentrate. By virtue of the reduction of the oxygen level to 0.02 ml. per 100 gms. of juice concentrate at the reference Brix level of 42° in the course of concentration of the citrus juice and by the avoidance of the need for cut-back juice which has a relatively high oxygen level, the flavorful juice concentrate is found to be surprisingly stable and the need for nitrogen sparging or other "inert" maintenance is eliminated.

It will be noted from the foregoing description that the heat of the compressed refrigerant gas is employed both (1) to boil the juice and separate therefrom desired volatiles containing flavor-producing constituents which boil at temperatures above and below that of water; and (2) to distill from the two-phase oily-watery mixture recovered by condensation a fraction containing said high and low boiling flavor-producing constituents. It will also be noted that when the hot compressed refrigerant gas is brought into heat exchange relation with the juice and the juice condensate it surrenders its heat and liquefies, whereafter it is recycled to a receiver and eventually may be used to condense either the volatiles recovered by boiling the juice or the desired flavor fraction recovered upon condensation. Advantageously, therefore, the flavor fraction of use is recovered as part of a cycle wherein the refrigerant gas is also employed to concentrate the juice. By repeatedly recirculating the refrigerant the latent heat of the refrigerant in a compressed condition may be utilized to supply heat for evaporation and the liquefied refrigerant may be employed to receive heat from vapors where a vapor condensate is to be recovered from the system.

It should be further noted that the flavor fraction of use eventually recovered will in the case of orange or other citrus juices appear somewhat milky but when allowed to settle will be seen to separate into a watery-phase superposed by an oily-phase. In practice all of the oily-phase or all of the watery-phase may not always be added back. As a consequence after a substantial portion of this oily-watery fraction is recovered that which is to be used will be separated from that which is not to be used such as by permitting the emulsion to settle in an elongated chamber and thereby separate into its respective phases so that the desired amount of each phase may then be conveniently added to the concentrate.

While the present invention has been described with particular reference to specific examples, it is not to be limited thereby, but reference is to be had to the appended claims for a definition of its scope.

What is claimed is:

1. Process of fortifying a fruit juice with a specific fraction of volatile constituents whose boiling points are above and below that of water comprising separating the juice at a temperature below about 140° F. under subatmospheric pressures in a closed system into a major concentrated juice portion and a minor volatile portion which contains said volatile flavor-producing constituents and substantially all of the oxygen, protecting said concentrated juice portion from the ingress of oxygen, condensing a major proportion of the volatile flavor-producing constituents as a first two-phase oily-watery mixture at a moderately, reduced temperature and discarding the minor proportion of the volatile portion which contains the uncondensed volatile constituents and substantially all of the oxygen, subjecting the resulting two-phase oily-watery mixture to a later concentration operation under subatmospheric pressures and at moderate temperatures to collect a mixture of said high and low boiling constituents, and combining a portion of nitrogen-stripped cut-back juice and said latter mixture with the juice concentrate from which said minor volatile portion has previously been removed in a closed system such that the final oxygen content of the combined product does not exceed 0.20 ml. per 100 gms. of the product at 42° Brix.

2. Process of fortifying a fruit juice with a specific fraction of volatile constituents whose boiling points are above and below that of water which comprises bringing the juice to an elevated temperature below about 140° F. under subatmospheric pressures in a closed system to partially concentrate said juice by separating it into a major concentrated juice portion and a minor volatile portion which contains said volatile flavor-producing constituents and substantially all of the oxygen, protecting said concentrated juice portion from the ingress of oxygen, subjecting said minor volatile portion to condensation at a temperature below about 70° F. that the major proportion of the volatile flavor-producing constituents therein are collected as a first two-phase oily-watery mixture, discarding the minor proportion of the volatile portion which contains the uncondensed volatile constituents and substantially all of the oxygen, distilling said two-phase oily-watery mixture under subatmospheric pressures and at a temperature between about 50°–100° F. in a closed system to collect a mixture of said high and low boiling constituents protecting the latter mixture from the ingress of oxygen, and combining a portion of nitrogen-stripped cut-back juice and said latter mixture with the juice concentrate from which said minor volatile portion has previously been removed in a closed system such that the final oxygen content of the combined product does not exceed 0.20 ml. per 100 gms of the product at 42° Brix.

3. Process of fortifying a fruit juice with a specific fraction of volatile constituents whose boiling points are above and below that of water comprising separating the juice at a temperature below about 140° F. under an absolute pressure of less than 1½" of Hg in a closed system into a major concentrated juice portion and a minor volatile portion which contains said volatile flavor-producing constituents and substantially all of the oxygen, protecting said concentrated juice portion from the ingress of oxygen, condensing a major proportion of the volatile flavor-producing constituents as a first two-phase oily-watery mixture at a temperature between about 30° and 75° F. and discarding the minor proportion of the volatile portion which contains the uncondensed volatile constituents and substantially all of the oxygen, subjecting the resulting two-phase oily-watery mixture to a later distillation at an absolute pressure of less than 1½" of Hg and at a temperature between about 50° and 100° F. to collect a mixture of said high and low boiling constituents while simultaneously preventing the ingress of oxygen into said two-phase oily-watery mixture, further concentrating said concentrated juice portion under conditions which prevent the addition of oxygen thereto, and combining the substantially oxygen free mixture of said high and low boiling constituents with the substantially oxygen free final juice concentrate and a portion of nitrogen-stripped cut-back juice in a closed system such that the final oxygen content of the combined product does not exceed 0.20 ml. per 100 gms. of the product at 42° Brix.

4. Process of fortifying a citrus fruit juice with a specific fraction of volatile constituents whose boiling points are above and below that of water, which comprises bringing the juice to a temperature above about 40° F. and below about 120° F. under an absolute pressure of less than 1½" Hg in a closed system to partially concentrate said juice by separating it into a major concentrated juice portion and a minor volatile portion which contains said volatile flavor-producing constituents and substantially all of the oxygen, protecting said concentrated juice portion from the ingress of oxygen, condensing a major proportion of the volatile flavor-producing constituents as a first two-phase oily-water mixture at a temperature from about 30°–70° F. and discarding the minor proportion of the volatile portion which contains the uncondensed volatile constituents and substantially all of the oxygen, subjecting the resulting two-phase oily-watery mixture to a later distillation under an absolute pressure of less than 1½″ of Hg and at a temperature between about 50° and 100° F. to collect a mixture of said high and low boiling constituents, while simultaneously preventing the ingress of oxygen into said two-phase oily-watery mixture, further concentrating said concentrated juice portion under conditions which prevent the addition of oxygen thereto, and combining the latter substantially oxygen free mixture of said high and low boiling constituents with the substantially oxygen free final juice concentrate and a portion of nitrogen-stripped cut-back juice in a closed system such that the final oxygen content of the combined product does not exceed 0.20 ml. per 100 gms. of the product at 42° Brix.

5. Process of fortifying orange juice with a specific fraction of volatile constituents whose boiling points are above and below that of water, which comprises rapidly flowing the juice in a thin continuous film over a heat exchange surface at a temperature between 40° F. and 80° F. under an absolute pressure of less than 1½″ Hg in a closed system to partially concentrate said juice by separating it into a major concentrated juice portion and a minor volatile portion which contains said volatile flavor-producing constituents and substantially all of the oxygen, protecting said concentrated juice portion from the ingress of oxygen, condensing a major proportion of the volatile flavor-producing constituents as a first two-phase oily-watery mixture and discarding the minor proportion of the volatile portion which contains the uncondensed volatile constituents and substantially all of the oxygen, rapidly flowing said two-phase mixture in a thin film over a second heat exchange surface at a temperature of 50°–100° F. under absolute pressures less than 1½″ Hg in a closed system to further concentrate said first two-phase oily-watery mixture in a later distillation to separate it into a minor subfraction of said high and low boiling flavor-producing constituents and a major subfraction containing mainly previously condensed water and a quantity of oily flavor-producing constituents while simultaneously preventing the ingress of oxygen into said two-phase oily-watery mixture, subjecting said minor subfraction to condensation at 30°–70° F. whereby a major proportion thereof is collected as a watery phase together with a minor proportion thereof as an oily phase while simultaneously preventing the ingress of oxygen into either of the latter phases and combining the substantially oxygen free phases with nitrogen-stripped cut-back juice in predetermined amounts with the substantially oxygen free juice concentrate from which said minor volatile portion has previously been removed in a closed system such that the final oxygen content of the combined product does not exceed 0.20 ml. per 100 gms. of the product at 42° Brix.

6. Process of fortifying a fruit juice with a specific fraction of volatile constituents whose boiling points are above and below that of water comprising separating the juice at a temperature below about 140° F. under subatmospheric pressures in a closed system into a major concentrated juice portion and a minor volatile portion which contains said volatile flavor-producing constituents and substantially all of the oxygen, protecting said concentrated juice portion from the ingress of oxygen, condensing a major proportion of the volatile flavor-producing constituents as a first two-phase oily-watery mixture at a moderately reduced temperature and discarding the minor proportion of the volatile portion which contains the uncondensed volatile constituents and substantially all of the oxygen, subjecting the resulting two-phase oily-watery mixture to a later concentration under subatmospheric pressures and at moderate temperatures to collect a mixture of said high and low boiling constituents, protecting the latter mixture from the ingress of oxygen, and combining a portion of nitrogen-stripped cut-back juice and said latter mixture with the juice concentrate from which said minor volatile portion has previously been removed in a closed system and in a manner such that they are blended together gently to eliminate splashing and any accompanying incorporation of air so that the final oxygen content of the blended product does not exceed 0.20 ml. per 100 gms. of the product at 42° Brix.

7. Process of fortifying a fruit juice with a specific fraction of volatile constituents whose boiling points are above and below that of water comprising separating the juice at a temperature less than about 140° F. under an absolute pressure of 1½″ Hg in a closed system into a major concentrated juice portion and a minor volatile portion which contains said volatile flavor-producing constituents and substantially all of the oxygen, protecting said concentrated juice portion from the ingress of oxygen, condensing a major proportion of the volatile flavor-producing constituents as a first two-phase oily-watery mixture at a temperature between about 30° and 75° F. and discarding the minor proportion of the volatile portion which contains the uncondensed volatile constituents and substantially all of the oxygen, subjecting the resulting two-phase oily-watery mixture to a later distillation under an absolute pressure of less than 1½″ of Hg and at a temperature between about 50° and 100° F. to collect a mixture of said high and low boiling constituents while simultaneously preventing the ingress of oxygen into said two-phase oily-watery mixture and combining the latter substantially oxygen free mixture with the substantially oxygen-free juice concentrate from which said minor volatile portion has previously been removed and a portion of nitrogen-stripped cut-back juice in a blend tank by feeding the liquids into the blend tank below the liquid level therein while gently agitating the liquid in said blend tank so as to prevent splashing and any accompanying incorporation of air while simultaneously purging the headspace of said blend tank with an inert gas to ensure that the final oxygen content of the combined product does not exceed 0.20 ml. per 100 gms. of the product at 42° Brix.

8. Process according to claim 1 wherein said juice concentrate, said cut back juice and said mixture of high and low boiling constituents are combined in the presence of an inert gas to prevent the ingress of oxygen thereinto.

References Cited by the Examiner
UNITED STATES PATENTS

| | | | |
|---|---|---|---|
| 2,450,774 | 10/1948 | Zahm | 99—205 |
| 2,513,813 | 7/1950 | Milleville | 99—205 |
| 2,625,050 | 1/1953 | Cross | 99—205 X |
| 2,911,308 | 11/1959 | Smith et al. | 99—205 X |
| 3,117,877 | 1/1964 | Byer et al. | 99—192 |
| 3,118,875 | 1/1964 | Byer et al. | 99—205 |
| 3,118,776 | 1/1964 | Byer et al. | 99—205 |

A. LOUIS MONACELL, *Primary Examiner.*

R. S. AULL, H. LORD, *Assistant Examiners*